United States Patent
Eckert

[11] Patent Number: 5,603,571
[45] Date of Patent: Feb. 18, 1997

[54] THERMOCOUPLE ASSEMBLY INCLUDING AN OUTER SLEEVE MADE IN PART OF A TITANIUM ALLOY

[76] Inventor: C. Edward Eckert, 260 Lynn Ann Dr., New Kensington, Pa. 15068

[21] Appl. No.: 539,653

[22] Filed: Oct. 5, 1995

Related U.S. Application Data

[63] Continuation of Ser. No. 108,474, Aug. 18, 1993, abandoned.

[51] Int. Cl.$^6$ .............................. G01K 1/12; G01K 1/10; G01K 7/04
[52] U.S. Cl. .............................. 374/140; 136/234; 266/99
[58] Field of Search .............................. 374/140; 136/234; 266/99, 87, 88

[56] References Cited

U.S. PATENT DOCUMENTS

| | | | |
|---|---|---|---|
| 3,975,212 | 8/1976 | Haupin et al. | 136/234 |
| 4,721,534 | 1/1988 | Phillippi et al. | 374/179 |
| 4,749,416 | 6/1988 | Greenspan | 1136/234 |
| 4,750,716 | 6/1988 | Reeve-Parker | 266/225 |
| 4,871,263 | 10/1989 | Wilson | 374/140 |
| 4,984,904 | 1/1991 | Nakano et al. | 374/140 |

FOREIGN PATENT DOCUMENTS

| | | | |
|---|---|---|---|
| 1107378 | 9/1978 | Japan | 374/140 |
| 0420889 | 3/1974 | U.S.S.R. | 374/140 |
| 0586343 | 12/1977 | U.S.S.R. | 374/140 |

*Primary Examiner*—Diego F. F. Gutierrez
*Attorney, Agent, or Firm*—Andrew Alexander

[57] ABSTRACT

An improved thermocouple assembly suitable for measuring the temperature of molten metal, the thermocouple assembly having a sleeve comprised of a closed end suitable for immersing in the molten metal. The sleeve is fabricated from a composite material comprised of titanium alloy and having an outside surface to be exposed to the molten metal coated with a refractory resistant to attack by the molten metal; and a thermocouple located in the sleeve in heat transfer relationship therewith.

42 Claims, 1 Drawing Sheet

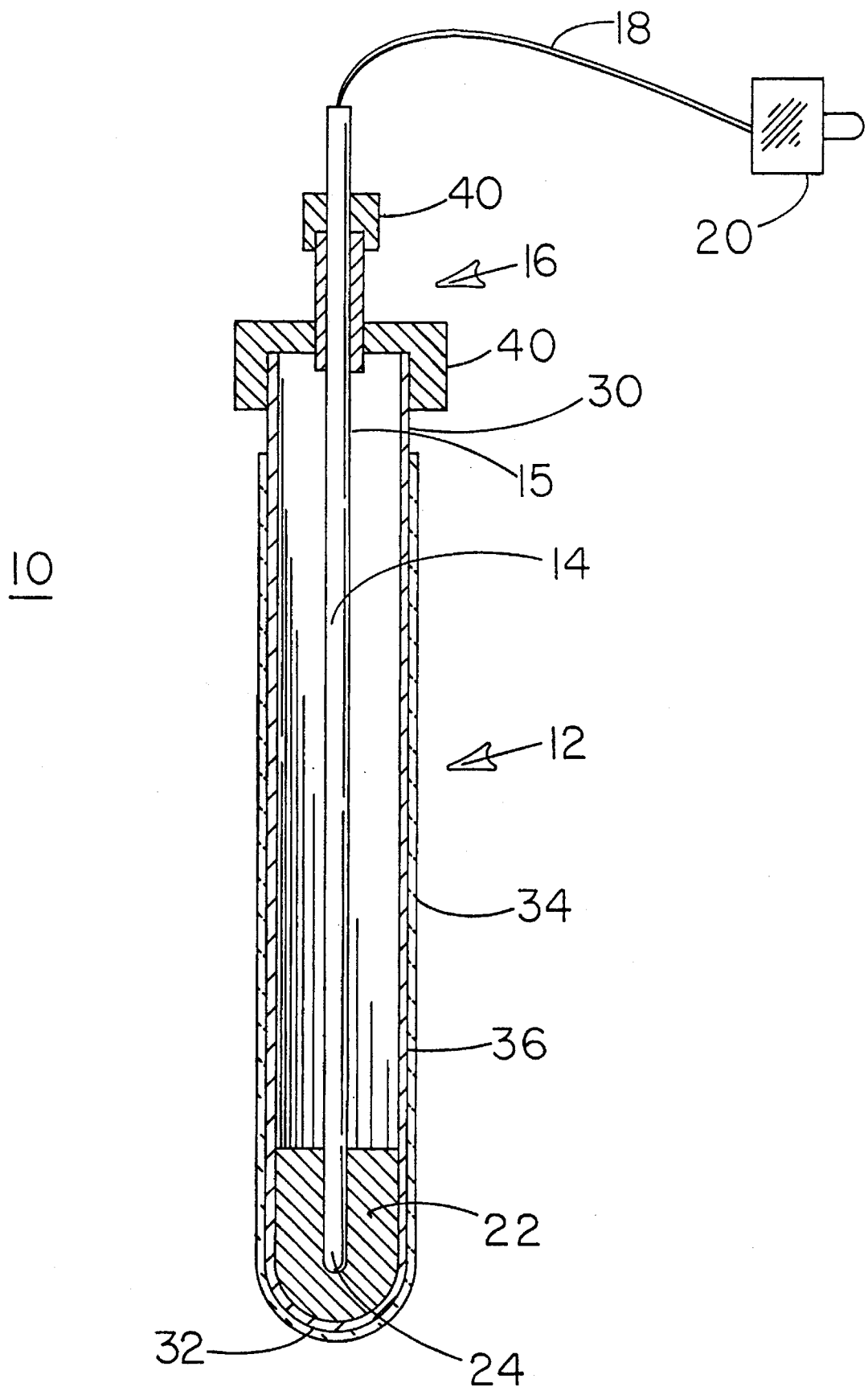

5,603,571

THERMOCOUPLE ASSEMBLY INCLUDING AN OUTER SLEEVE MADE IN PART OF A TITANIUM ALLOY

This application is a continuation, of application Ser. No. 08/108,474 filed Aug. 18, 1993 now abandoned.

BACKGROUND OF THE INVENTION

This invention relates to thermocouples, and more particularly, it relates to thermocouples suitable for use in molten metals such as molten aluminum.

In the prior art, thermocouples used for molten aluminum are usually enclosed in a cast iron tube and coated with a refractory. Such thermocouples only last from about 2 to 7 days. Further, when such thermocouples are immersed in molten metal, they require considerable time to reach molten metal temperature. Thus, there is a great need for an improved thermocouple suitable for use with molten metal, e.g., aluminum, which has an extended life and which has a fast response time. The present invention provides such a thermocouple.

SUMMARY OF THE INVENTION

It is an object of the invention to provide an improved thermocouple assembly.

It is another object of the invention to provide an improved thermocouple assembly for use in molten metal such as molten aluminum.

Yet, another object of this invention is to provide an improved thermocouple assembly for use in molten metal, the thermocouple assembly having a protective sleeve having a thermal conductivity of less than 30 BTU/ft$^2$/hr°F. and having a thermal expansion coefficient of less than $15 \times 10^{-6}$ in/in/°F.

And yet, another object of the invention is to provide an improved thermocouple assembly for use in molten metal, the thermocouple assembly having a protective sleeve having a thermal conductivity of less than 30 BTU/ft$^2$/hr/°F. and having a thermal expansion coefficient of less than $15 \times 10^{-6}$ in/in/°F. and having a chilling power of less than 5000 BTU$^2$/ft$^4$/hr/°F.

And yet, it is a further object of the invention to provide an improved thermocouple assembly for use in molten metal, the thermocouple assembly having a protective sleeve comprised of a novel material resistant to erosion or dissolution by molten metal such as molten aluminum.

These and other objects will become apparent from the specification, drawings and claims appended hereto.

In accordance with these objects, there is disclosed an improved thermocouple assembly suitable for measuring the temperature of molten metal. The thermocouple assembly is comprised of a sleeve having a closed end suitable for immersing in said molten metal, the sleeve fabricated from a composite material comprised of titanium or titanium alloy and having an outside surface to be exposed to the molten metal coated with a refractory resistant to attack by the molten metal. A thermocouple is located in the sleeve in heat transfer relationship therewith.

BRIEF DESCRIPTION OF THE FIGURE

The FIGURE is a cross-sectional view of a thermocouple in accordance with the invention.

DETAILED DESCRIPTION OF THE PREFERRED EMBODIMENTS

Referring to the FIGURE, there is shown a schematic of a thermocouple assembly 10 in accordance with the invention. The thermocouple assembly is comprised of a protective sleeve 12, a heat sensor 14 and cap 16. A lead 18 extends from heat sensor 14 and terminates in a plug 20 suitable for plugging into a recorder. In a preferred embodiment, assembly 10 can contain a heat transfer medium 22 in which heat sensing tip 24 of thermocouple 14 is immersed. The medium may be a liquid or solid at room temperature but preferably is liquid at the molten metal or furnace operating temperature.

Preferably, protective sleeve 12 is comprised of titanium tube 30 having a closed end 32. While the protective sleeve is illustrated as a tube, it will be appreciated that any configuration that protects or envelops thermocouple 14 and leads extending therefrom to plug 20 may be employed. Thus, reference to tube herein is meant to include such configurations. A refractory coating 34 is employed which is resistant to attack by the environment in which the thermocouple assembly is used. A bond coating 36 may be employed between the refractory coating and titanium tube 30. Thermocouple 14 is seated or secured in tube 30 by any convenient means. For example, swaglock nuts 40 and ferrules may be employed or the end of the tube may be crimped or swaged shut to provide a secure fit with sheath 15 of thermocouple 14. In the invention, any of these methods of holding or sealing the thermocouple in tube 30 may be employed. It should be understood that tube 30 does not always have to be sealed. This is true, for example, if tube 30 is used only as a protective sheath or sleeve for thermocouple 14, and such is contemplated within the invention. That is, the thermocouple assembly can be used without a heat transfer medium, for example, if slower response times are less important.

While it is preferred to fabricate tube 30 out of a titanium base alloy, tube 10 may be fabricated from any metal or metalloid material suitable for contacting molten metal and which material is resistant to dissolution or erosion by the molten metal. Other materials that may be used to fabricate tube 30 include silicon, niobium, chromium, molybdenum, combinations of NiF (364 NiFe) and NiTiC (40 Ni 60TIC), particularly when such materials have low thermal expansion and low chilling power, all referred to herein as metals. For protection purposes, it is preferred that the metal or metalloid be coated with a material such as a refractory resistant to attack by molten metal suitable for use as a protective sleeve.

Further, the material of construction for tube 30 should have a thermal conductivity of less than 30 BTU/ft$^2$/hr/°F., and preferably less than 15 BTU/ft$^2$/hr/°F., with a most preferred material having a thermal conductivity of less than 10 BTU/ft$^2$/hr/°F. Another important feature of a desirable material for tube 30 is thermal expansion. Thus, a suitable material should have a thermal expansion coefficient of less than $15 \times 10^{-6}$ in/in/°F., with a preferred thermal expansion coefficient being less than $10 \times 10^{-6}$ in/in/°F., and the most preferred being less than $5 \times 10^{-6}$ in/in/°F. Another important feature of the material useful in the present invention is chilling power. Chilling power is defined as the product of heat capacity, thermal conductivity and density. Thus, preferably the material in accordance with the invention has a chilling power of less than 5000, preferably less than 2000 and typically in the range of 100 to 750 BTU$^2$/ft$^4$/hr/°F. Further, preferably, the material is capable of being heated by direct resistance or by passage of an electrical current through the material.

As noted, the preferred material for fabricating into tubes 30 is a titanium base material or alloy having a thermal conductivity of less than 30 BTU/ft$^2$/hr/°F., preferably less than 15 BTU/ft$^2$/hr/°F., and typically less than 10 BTU/ft$^2$/hr/°F., and having a thermal expansion coefficient less than 15×10$^{-6}$ in/in/ °F., preferably less than 10×10$^{-6}$ in/in/°F., and typically less than 5×10$^{-6}$ in/in/°F. The titanium material or alloy should have chilling power as noted, and for titanium, the chilling power can be less than 500, and preferably less than 400, and typically in the range of 100 to 300 BTU/ft$^2$/hr/°F.

When the thermocouple assembly is being used in molten metal such as lead, for example, the titanium base alloy need not be coated to protect it from dissolution. For other metals, such as aluminum, copper, steel, zinc and magnesium, refractory-type coatings should be provided to protect against dissolution of the metal or metalloid tube by the molten metal.

For most molten metals, the titanium alloy that should be used is one that preferably meets the thermal conductivity requirements, the chilling power and the thermal expansion coefficient noted herein. Further, typically, the titanium alloy should have a yield strength of 30 ksi or greater at room temperature, preferably 70 ksi, and typical 100 ksi. The titanium alloys included herein and useful in the present invention include CP (commercial purity) grade titanium, or alpha and beta titanium alloys or near alpha titanium alloys, or alpha-beta titanium alloys. The alpha or near-alpha alloys can comprise, by wt. %, 2 to 9 Al, 0 to 12 Sn, 0 to 4 Mo, 0 to 6 Zr, 0 to 2 V and 0 to 2 Ta, and 2.5 max. each of Ni, Nb and Si, the remainder titanium and incidental elements and impurities.

Specific alpha and near-alpha titanium alloys contain, by wt. %, about:

(a) 5 Al, 2.5 Sn, the remainder Ti and impurities.

(b) 8 Al, 1 Mo, 1 V, the remainder Ti and impurities.

(c) 6 Al, 2 Sn, 4 Zr, 2 Mo, the remainder Ti and impurities.

(d) 6 Al, 2 Nb, 1 Ta, 0.8 Mo, the remainder Ti and impurities.

(e) 2.25 Al, 11 Sn, 5 Zr, 1 Mo, the remainder Ti and impurities.

(f) 5 Al, 5 Sn, 2 Zr, 2 Mo, the remainder Ti and impurities.

The alpha-beta titanium alloys comprise, by wt. %, 2 to Al, 0 to 5 Mo, 0 to 5 Sn, 0 to 5 Zr, 0 to 11 V, 0 to 5 Cr, 0 to 3 Fe, with 1 Cu max., 9 Mn max., 1 Si max., the remainder titanium, incidental elements and impurities.

Specific alpha-beta alloys contain, by wt. %, about:

(a) 6 Al, 4 V, the remainder Ti and impurities.

(b) 6 Al, 6 V, 2 Sn, the remainder Ti and impurities.

(c) 8 Mn, the remainder Ti and impurities.

(d) 7 Al, 4 Mo, the remainder Ti and impurities.

(e) 6 Al, 2 Sn, 4 Zr, 6 Mo, the remainder Ti and impurities.

(f) 5 Al, 2 Sn, 2 Zr, 4 Mo, 4 Cr, the remainder Ti and impurities.

(g) 6 Al, 2 Sn, 2 Zn, 2 Mo, 2 Cr, the remainder Ti and impurities.

(h) 10 V, 2 Fe, 3 Al, the remainder Ti and impurities.

(i) 3 Al, 2.5 V, the remainder Ti and impurities.

The beta titanium alloys comprise, by wt. %, 0 to 14 V, 0 to 12 Cr, 0 to 4 Al, 0 to 12 Mo, 0 to 6 Zr and 0 to 3 Fe, the remainder titanium and impurities.

Specific beta titanium alloys contain, by wt. %, about:

(a) 13 V, 11 Cr, 3 Al, the remainder Ti and impurities.

(b) 8 Mo, 8 V, 2 Fe, 3 Al, the remainder Ti and impurities.

(c) 3 Al, 8 V, 6 Cr, 4 Mo, 4 Zr, the remainder Ti and impurities.

(d) 11.5 Mo, 6 Zr, 4.5 Sn, the remainder Ti and impurities.

When it is necessary to provide a coating to protect tube 30 of metal or metalloid from dissolution or attack by molten metal, a refractory coating 34 is applied to the outside surface of tube 30. The coating should be applied above the level to which the thermocouple assembly is immersed in the molten metal. The refractory coating can be any refractory material which provides the tube with a molten metal resistant coating. The refractory coating can vary, depending on the molten metal being cast. Thus, a novel composite material is provided permitting use of metals or metalloids having the required thermal conductivity and thermal expansion for use with molten metal which heretofore was not deemed possible. The refractory coating may be applied both to the inside and outside of the tube.

When the thermocouple is to be used with molten metal such as aluminum, magnesium, zinc, or copper, etc., a refractory coating may comprise at least one of alumina, zirconia, yittria stabilized zirconia, magnesia, magnesium titanite, or mullite or a combination of alumina and titania. While the refractory coating can be used on the metal or metalloid comprising the tube, a bond coating 36 can be applied between the base metal and the refractory coating. The bond coating can provide for adjustments between the thermal expansion coefficient of the base metal alloy, e.g., titanium, and the refractory coating when necessary. The bond coating thus aids in minimizing cracking or spalling of the refractory coat when the tube is immersed in the molten metal or brought to operating temperature. When the thermocouple is cycled between molten metal temperature and room temperature, for example, the bond coat can be advantageous in preventing cracking, particularly if there is a considerable difference between the thermal expansion of the metal or metalloid and the refractory.

Typical bond coatings comprise Cr—Ni—Al alloys and Cr—Ni alloys, with or without precious metals. Bond coatings suitable in the present invention are available from Metco Inc., Cleveland, Ohio, under the designation 460 and 1465. In the present invention, the refractory coating should have a thermal expansion that is plus or minus five times that of the base material. Thus, the ratio of the coefficient of expansion of the base material can range from 5:1 to 1:5, preferably 1:3 to 1:1.5. The bond coating aids in compensating for differences between the base material and the refractory coating.

The bond coating has a thickness of 0.1 to 5 mils with a typical thickness being about 0.5 mil. The bond coating can be applied by sputtering, plasma or flame spraying, chemical vapor deposition, spraying, dipping or mechanical bonding by rolling, for example.

After the bond coating has been applied, the refractory coating is applied. The refractory coating may be applied by any technique that provides a uniform coating over the bond coating. The refractory coating can be applied by aerosol, sputtering, plasma or flame spraying, for example. Preferably, the refractory coating has a thickness in the range of 0.3 to 42 mils, preferably 5 to 15 mils, with a suitable thickness being about 10 mils. The refractory coating may be used without a bond coating.

In a preferred embodiment, a heat transfer medium 22 is provided in tube 30 substantially as shown in the Figure. For purposes of this embodiment of the invention, it is sufficient if heat sensing tip 24 is immersed in the heat transfer medium. However, the level of medium can be higher, if desired. Consideration should be given to undue pressure that can build up if the tube is sealed. Thus, it is preferred that the heat transfer medium have a partial pressure of less than 1 atm and typically less than 0.5 atm at molten metal temperature. The partial pressure is important in order to limit the internal pressure in sleeve 12. Further, the partial pressure is important in order to maintain the stability of the heat transfer medium. For example, if the medium boils and one component thereof condenses in upper regions of sleeve 12, this can change the composition of the medium.

Further, it is preferred that the medium is substantially chemically inert with respect to the inside of tube 30. That is, it is preferred that the medium does not react with or attack the inside of tube 30 in a way that would shorten the life of the thermocouple assembly. Further, it is preferred that the medium does not react with sheath 15 covering the thermocouple leads. For best results, it is preferred that the medium make intimate contact with the thermocouple sensing element and the inside surface of tube 30 for optimum heat transfer. This permits the thermocouple assembly to provide fast response times, for example 60 seconds or less, preferably 30 seconds or less, and typically 20 seconds when it is immersed in molten metal. Thus, it will be appreciated that because of the faster response times, much better control can be applied to molten metal processes.

It is preferred that the medium have a low melting point to aid in minimizing response time. Thus, the melting point can be as low as 150° C., for example, and preferably 325° C. or less.

A medium that has been found useful can comprise 36 to 62 wt. % Bi, 9 to 31 wt. % In, 8 to 26 wt. % Pb, the remainder Sn and incidental elements and impurities. A preferred composition for the medium can comprise 42 to 54 wt. % Bi, 18 to 24 wt. % In, 14 to 22 wt. % Pb, the remainder Sn and incidental elements and impurities. A typical composition for the medium can comprise 49 wt. % Bi, 21 wt. % In, 18 wt. % Pb and about 12 wt. % Sn. It will be appreciated that additions may be made to this medium, and other medium may be used, all of which are intended to be within the purview of the invention. It should be noted that substantially pure In can be used or In can be used in binary or ternary combinations with Bi or Pb. Further, Pb can be used with or without other elements.

For purposes of testing the response, two thermocouple assemblies were immersed in a trough having flowing molten aluminum. The thermocouple assembly used a 0,125 inch diameter stainless steel sheathed type K thermocouple 14 and a tube 30 of CP (commercial purity) grade titanium having a 1 mil thick bond coating of Ni—Cr—Al alloy. On the bond coating was applied a coating of alumina. One alumina coating was applied to a thickness of 27 mil (0.027") to provide a first thermocouple assembly, and another alumina coating was applied to a thickness of 12 mil (0.012") to provide a second thermocouple assembly. 51.2 gms of an alloy medium consisting of 49 wt. % Bi, 21 wt. % In, 18 wt. % Pb and 12 wt. % Sn were added to tube 30 to provide a medium 22 having a melting point of 56° C.

The first thermocouple assembly was immersed in molten aluminum at a temperature of 718° C. (1325° F.) and reached melt temperature in 31 seconds. The second thermocouple assembly was immersed in the same molten aluminum and reached melt temperature in 16 seconds. A conventional thermocouple in a ceramic coated cast iron sleeve was immersed in the same molten aluminum and reached melt temperature in 235 seconds. The first thermocouple assembly reached 63.2% of its terminal value in 7.2 seconds and the second thermocouple, in 5.1 seconds. The conventional cast iron protected thermocouple required 71 seconds to reach 63.2% of its terminal value.

Thus, it will be seen that the thermocouple assembly of the invention has a much faster response time than conventional ceramic coated cast iron protected thermocouples. In addition, the thermocouple assembly of the invention has a much longer useful life. That is, the ceramic coated cast iron protected thermocouples have a useful life on the order of 2 to 10 days. The thermocouple assembly of the invention has a useful life of at least 30 days and typically 60 to 90 days. Thus, it will be noted that the subject thermocouple assembly is a marked advance over the art.

While the invention has been described in terms of preferred embodiments, the claims appended hereto are intended to encompass other embodiments which fall within the spirit of the invention.

What is claimed is:

1. An improved thermocouple assembly suitable for measuring the temperature of molten metal, the thermocouple assembly comprised of:

(a) a sleeve having a closed end suitable for immersing in said molten metal, the sleeve fabricated from a composite material comprised of titanium alloy and having an outside surface to be exposed to said molten metal coated with a refractory resistant to attack by said molten metal, the titanium alloy having a thermal coefficient of expansion of less than $15 \times 10^{-6}$ in/in/°F., said refractory and said titanium alloy having a ratio of coefficient of thermal expansion in the range of 5:1 to 1:5; and (b) a thermocouple located in said sleeve in heat transfer relationship therewith.

2. The thermocouple assembly in accordance with claim 1 wherein the composite material has a thermal conductivity of less than 30 $BTU/ft^2/hr/°F$.

3. The thermocouple assembly in accordance with claim 1 wherein the composite material has a thermal conductivity of less than 15 $BTU/ft^2/hr/°F$.

4. The thermocouple assembly in accordance with claim 1 wherein the titanium alloy has a thermal expansion coefficient of less than $10 \times 10^{-6}$ in/in/°F. and a chilling power of less than 5000 $BTU^2/ft^4/hr/°F$.

5. The thermocouple assembly in accordance with claim 1 wherein the titanium base alloy is a titanium alloy selected from the group consisting of alpha, beta, near alpha, and alpha-beta titanium alloys having a chilling power of less than 500 $BTU^2/ft^4/hr/°F$.

6. The thermocouple assembly in accordance with claim 1 wherein the titanium base alloy is a titanium alloy selected from the group consisting of 6242, 1100 and CP grade.

7. The thermocouple assembly in accordance with claim 1 wherein a bond coating is provided between the titanium alloy sleeve's outside surface and the refractory.

8. The thermocouple assembly in accordance with claim 7 wherein said bond coating has a thickness in the range of 0.1 to 5 mils.

9. The thermocouple assembly in accordance with claim 1 wherein the refractory is selected from the group consisting of one of $Al_2O_3$, $ZrO_2$, $Y_2O_3$ stabilized $ZrO_2$, and $Al_2O_3$—$TiO_2$ bonded to said titanium alloy.

10. The thermocouple assembly in accordance with claim 1 wherein said refractory has a thickness in the range of 0.3 to 42 mils.

11. The thermocouple assembly in accordance with claim 1 wherein a bond coating is provided between said titanium alloy and said refractory and said bond coating comprises an alloy selected from the group consisting of a Cr—Ni—Al alloy and a Cr—Ni alloy.

12. The thermocouple assembly in accordance with claim 1 wherein the refractory comprises alumina.

13. The thermocouple assembly in accordance with claim 1 wherein the refractory comprises zirconia.

14. The thermocouple assembly in accordance with claim 1 wherein the refractory comprises yttria stabilized zirconia.

15. The thermocouple assembly in accordance with claim 1 wherein the refractory comprises 5 to 20 wt. % titania and the balance alumina.

16. The thermocouple assembly in accordance with claim 1 wherein the sleeve contains a heat transfer medium that is liquid at the molten metal temperature.

17. The thermocouple assembly in accordance with claim 1 wherein the sleeve contains a heat transfer medium comprised of a metal alloy liquid at molten metal temperature and having a vapor pressure less than 1 atmosphere.

18. The thermocouple assembly in accordance with claim 1 wherein the sleeve contains a heat transfer medium comprised of metal alloy liquid at molten metal temperature and substantially non-reactive with said titanium sleeve and with said thermocouple.

19. The thermocouple assembly in accordance with claim 1 wherein said sleeve contains a metal alloy comprised of In and at least one of Bi, Pb and Sn.

20. The thermocouple assembly in accordance with claim 1 wherein said sleeve contains an alloy comprised of 36 to 62 wt. % Bi, 9 to 31 wt. % In, 8 to 26 wt. % Pb, the remainder Sn.

21. The thermocouple assembly in accordance with claim 1 wherein said sleeve contains an alloy comprised of 42 to 54 wt. % Bi, 18 to 24 wt. % In, 14 to 22 wt. % Pb, the remainder Sn.

22. A thermocouple assembly suitable for measuring the temperature of molten metal, the thermocouple assembly comprised of:

sleeve having a closed end suitable for immersing in said molten metal, the sleeve fabricated from a composite material comprised of:
(i) a base metal layer of a titanium alloy;
(ii) a bond coat bonded to an outside surface of said base layer to coat said surface;
(iii) a refractory layer bonded to said bond coat, the refractory layer resistant to attack by said molten metal, the composite material having a thermal conductivity of less than 30 BTU/ft$^2$/hr/°F., a thermal expansion coefficient of less than 15×10 in/in/°F., and a chilling power of less than 950 BTU$^2$/ft$^4$/hr/°F., said refractory layer and said titanium alloy having a ratio of coefficient of thermal expansion in the range of 5:1 to 1:5; and (b) a thermocouple located in said sleeve in heat transfer relationship therewith.

23. The thermocouple assembly in accordance with claim 22 wherein said titanium alloy is selected from 6242, Ti 1100 and CP grade titanium.

24. The thermocouple assembly in accordance with claim 22 wherein said base metal layer has a coefficient of thermal expansion of less than 5×10$^{-6}$ in/in/°F.

25. The thermocouple assembly in accordance with claim 22 wherein said bond coat has a thickness in the range of 0.1 to 5 mils and said refractory layer has a thickness in the range of 0.3 to 42 mils.

26. The thermocouple assembly in accordance with claim 22 wherein said refractory layer is selected from the group consisting of one of Al$_2$O$_3$, ZrO$_2$, Y$_2$O$_3$ stabilized ZrO$_2$, and Al$_2$O$_3$—TiO$_2$.

27. The thermocouple assembly in accordance with claim 22 wherein said bond coat comprises an alloy selected from the group consisting of Cr—Ni—Al alloy and Cr—Ni alloy.

28. The thermocouple assembly in accordance with claim 22 wherein the sleeve contains a heat transfer medium that is liquid at the molten metal temperature.

29. The thermocouple assembly in accordance with claim 22 wherein the sleeve contains a heat transfer medium comprised of a metal alloy liquid at molten metal temperature and having a vapor pressure less than 1 atmosphere.

30. The thermocouple assembly in accordance with claim 22 wherein the sleeve contains a heat transfer medium comprised of metal alloy liquid at molten metal temperature and substantially non-reactive with said titanium sleeve and with said thermocouple.

31. The thermocouple assembly in accordance with claim 22 wherein said sleeve contains a metal alloy comprised of Bi, In, Pb and Sn.

32. The thermocouple assembly in accordance with claim 22 wherein said sleeve contains an alloy comprised of 36 to 62 wt. % Bi, 9 to 31 wt. % In, 8 to 26 wt. % Pb, the remainder Sn.

33. The thermocouple assembly in accordance with claim 22 wherein said sleeve contains an alloy comprised of 42 to 54 wt. % Bi, 18 to 24 wt. % In, 14 to 22 wt. % Pb, the remainder Sn.

34. A thermocouple assembly suitable for measuring the temperature of molten metal, the thermocouple assembly comprised of:

(a) sleeve having a closed end suitable for immersing in said molten metal, the sleeve fabricated from a composite material comprised of:
(i) a base metal layer of a titanium alloy selected from the group consisting of alpha, beta, near alpha, and alpha-beta titanium alloys;
(ii) a bond coat bonded to an outside surface of said base layer to coat said surface; and
(iii) a refractory layer bonded to said bond coat, the refractory layer resistant to attack by said molten metal, the composite material having a thermal conductivity of less than 30 BTU/ft$^2$/hr/°F. and a thermal expansion coefficient of less than 10×10$^{-6}$ in/in/°F. and a chilling power of less than 500 BTU$^2$/ft$^4$/hr/°F., said refractory layer and said titanium alloy having a ratio of coefficient of thermal expansion in the range of 5:1 to 1:5; and (b) a thermocouple located in said sleeve in heat transfer relationship therewith.

35. A thermocouple assembly suitable for measuring the temperature of molten metal, the thermocouple assembly comprised of:

(a) sleeve having a closed end suitable for immersing in said molten metal, the sleeve fabricated from a composite material comprised of:
(i) a base layer of a titanium alloy;
(ii) a bond coat bonded to an outside surface of said sleeve to coat said surface;
(iii) a refractory layer selected from a material from the group consisting of Al$_2$O$_3$, ZrO$_2$, Y$_2$O$_3$ stabilized ZrO$_2$, and Al$_2$O$_3$—TiO$_2$ bonded to said bond coat, the refractory layer resistant to attack by said molten metal, the composite material having a thermal conductivity of less than 10 BTU/ft$^2$/hr/°F. and a thermal expansion coefficient of less than 5×10$^{-6}$ in/in/°F., said refractory layer and said titanium alloy having a ratio of coefficient of thermal expansion in the range of 5:1 to 1:5;

(iv) a heat transfer medium selected from a metal alloy that becomes molten at less than 325° C.; and (b) a thermocouple located in said sleeve having a heat sensing element located in said heat transfer medium.

36. The thermocouple assembly in accordance with claim 35 wherein the refractory layer is $Al_2O_3$ and said titanium alloy is selected from 6242, Ti 1100 and CP grade titanium.

37. The thermocouple assembly in accordance with claim 35 wherein said medium is selected from an alloy comprised of 36 to 62 wt. % Bi, 9 to 31 wt. % In, 8 to 26 wt. % Pb, the remainder Sn.

38. The thermocouple assembly in accordance with claim 35 wherein said base layer has a chilling power in the range of 100 to 700 $BTU^2/ft^4/hr/°F$.

39. An improved thermocouple assembly suitable for measuring the temperature of molten metal, the thermocouple assembly comprised of:

(a) a sleeve having a closed end suitable for immersing in said molten metal, the sleeve fabricated from a composite material comprised of a titanium alloy and having an outside surface to be exposed to said molten metal coated with a refractory resistant to attack by said molten metal, the titanium alloy having a thermal expansion coefficient of less than $10 \times 10^{-6}$ in/in/°F. and a chilling power of less than 5000 $BTU^2/ft^4/hr/°F$.; and (b) a thermocouple located in said sleeve in heat transfer relationship therewith.

40. The thermocouple assembly in accordance with claim wherein said titanium alloy has a chilling power of less than 2000 $BTU^2/ft^4/hr/°F$.

41. The thermocouple assembly in accordance with claim 39 wherein said titanium alloy has a chilling power in the range of 100 to 700 $BTU^2/ft^4/hr/°F$.

42. The thermocouple assembly in accordance with claim 39 wherein the titanium alloy has a thermal expansion coefficient of less than $5 \times 10^{-6}$ in/in/°F.

\* \* \* \* \*